US007805057B1

(12) United States Patent
Schylander

(10) Patent No.: US 7,805,057 B1
(45) Date of Patent: Sep. 28, 2010

(54) RECORD CARRIER, APPARATUS AND METHOD

(75) Inventor: Erik C. Schylander, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/315,707

(22) Filed: May 20, 1999

(30) Foreign Application Priority Data

May 26, 1998 (EP) .................................. 98201732

(51) Int. Cl.
*H04N 5/91* (2006.01)
(52) U.S. Cl. ........................................ 386/95; 386/125
(58) Field of Classification Search .................... 386/46, 386/95, 125–126, 68, 111, 70
See application file for complete search history.

(56) References Cited

U.S. PATENT DOCUMENTS

| 4,180,854 | A | * | 12/1979 | Walden et al. | 708/130 |
| 5,671,411 | A |   | 9/1997  | Watts et al.  | 395/615 |
| 5,933,569 | A | * | 8/1999  | Sawabe et al. | 396/94  |
| 6,064,794 | A | * | 5/2000  | McLaren et al.| 386/68  |
| 6,067,400 | A | * | 5/2000  | Saeki et al.  | 386/95  |
| 6,253,018 | B1| * | 6/2001  | Moriyama et al.| 386/46 |
| 6,438,315 | B1| * | 8/2002  | Suzuki et al. | 386/95  |

FOREIGN PATENT DOCUMENTS

| EP | 0614188 | A2 |   | 9/1994  |
| EP | 0677842 | A1 |   | 10/1995 |
| EP | 0689206 | A1 | * | 12/1995 |
| EP | 0788094 | A1 |   | 8/1997  |
| EP | 0788105 | A1 | * | 8/1997  |
| WO | 9516262 | A1 |   | 6/1995  |
| WO | 9707504 | A1 |   | 2/1997  |
| WO | WO9708893 |  |   | 3/1997  |
| WO | WO9809290 |  |   | 3/1998  |

OTHER PUBLICATIONS

Mathematical Structures for Computer Science 3rd, Judith L. Gersting, Copyrights 1993, 1987, 1982 W.H. Freeman & Company, pp. 63, 64, 65, 66, 68, 69, 70, 107, 108, 109, total pp. 14, "If them Else" Pages include, ID Date of Pub, Cover & TOC.*
Schaum's OutLines Programming with C 2 nd Edition, Brron S. Gottfried, Ph. D, McGraw-Hill 1996, total pp. 5, p. 160, 6.11 "The GOTO Statement" Pages include ID Date of Pub, Cover & TOC.*
Java 2nd Deitel & Deital @1997, 1998, pp. 69-70, During the 1960s, the, "GOTO", total pp. 5 Pages include ID Date of Pub, Cover & TOC.*

* cited by examiner

*Primary Examiner*—Vincent Boccio

(57) ABSTRACT

A record carrier (1) of the invention stores at least video-related user data and control data in digital form. The control data enables playback control of the user data, which control data comprises at least play control data which defines user data items which are playable, at least selection control data for enabling the user to select and control reproduction of user data and at least variable control data for operating on user and system variables. The record carrier (1) is characterized in that the variable control data comprises at least one instruction for a conditional arithmetical operation.

43 Claims, 6 Drawing Sheets

| BYTE #1 0.2 \| 3.4 \| 5.7 | BYTE #2 | BYTE #3 | BYTE #4 | BYTE #5 | ABBREVIATION AND DESCRIPTION | |
|---|---|---|---|---|---|---|
| 001 cond0 calc | i | j | k | l | calc | IF cond0 { V [j] := V [k] opcode V l ) |
| 010 cond0 000 | i | -- | k | l | move0 | IF cond0 { V [k] := V l } |
| cond1 001 | i | -- | k | l | move1 | IF cond1 { V [k] := V l } |
| cond0 010 | i | j | dd | dd | fill0 | IF cond0 { V [j] := dddd } |
| 00 110 | i | j | dd | dd | fillr | WHILE V [i] >= 0 { V [j] + V [i] ] := dddd; V [i] -- } |
| 100 cond0 000 | i | -- | offs | offs | jump0 | IF cond0 { goto offs } |
| cond1 001 | i | j | offs | offs | jump1 | IF cond1 { goto offs } |
| cond0 010 | i | j | -- | -- | return | IF cond0 { goto V [j] } |
| cond0 100 | i | -- | offs | offs | loop0 | IF cond0 { dec ( V [i]; goto offs } |
| cond1 101 | i | -- | offs | offs | loop1 | IF cond1 { dec ( V [i]; goto offs } |
| cond0 110 | i | j | offs | offs | loop2 | IF cond0 { dec ( V [i], V [j]); goto offs } |
| 110 cond0 000 | i | j | offs | offs | jumpw | IF cond0 { wait V [j] SECONDS FOR INPUT; goto offs } |

| FIELD NAME | SIZE (BITS) |
|---|---|
| PLAY LIST HEADER | 8 |
| NUMBER OF ITEMS (NOI) | 8 |
| LIST ID | 16 |
| PREVIOUS LIST OFFSET | 16 |
| NEXT LIST OFFSET | 16 |
| RETURN LIST OFFSET | 16 |
| PLAYING TIME | 16 |
| PLAY ITEM WAIT TIME | 8 |
| AUTO PAUSE WAIT TIME | 8 |
| PLAY ITEM #1 NUMBER | 16 |
| --- | |
| --- | |
| PLAY ITEM #NOI NUMBER | 16 |

FIG. 2

| FIELD NAME | SIZE (BITS) |
|---|---|
| SELECTION LIST HEADER | 8 |
| FLAGS | 8 |
| NUMBER OF SELECTIONS (NOS) | 8 |
| BASE OF SELECTION NUMBER (BSN) | 8 |
| LIST ID | 16 |
| PREVIOUS LIST OFFSET | 16 |
| NEXT LIST OFFSET | 16 |
| RETURN LIST OFFSET | 16 |
| DEFAULT LIST OFFSET | 16 |
| TIME-OUT LIST OFFSET | 16 |
| WAIT TIME FOR TIME-OUT | 8 |
| LOOP COUNT & JUMP TIMING | 8 |
| PLAY ITEM NUMBER | 16 |
| SELECTION #BSN OFFSET | 16 |
| -- | |
| -- | |
| SELECTION #(BSN + NOS-1) OFFSET | 16 |

FIG. 3

| FIELD NAME | SIZE ( BITS ) |
|---|---|
| COMMAND LIST HEADER | 8 |
| INSTRUCTION | 40 |
| NEXT_LIST OFFSET | 16 |

FIG. 4

| BYTE #1 | | | BYTE #2 | BYTE #3 | BYTE #4 | BYTE #5 | ABBREVIATION AND DESCRIPTION | |
|---|---|---|---|---|---|---|---|---|
| 0..2 | 3..4 | 5..7 | | | | | | |
| 001 | cond0 | calc | i | j | k | l | calc | IF cond0 ( V [j] := V [k] opcode V [l] ) |
| 010 | cond0 | 000 | i | -- | k | l | move0 | IF cond0 ( V [k] := V [l] ) |
|  | cond1 | 001 | i | j | k | l | move1 | IF cond1 ( V [k] := V [l] ) |
|  | cond0 | 010 | i | j | dd | dd | fill0 | IF cond0 ( V [j] := dddd ) |
|  | 00 | 110 | i | j | dd | dd | fillr | WHILE V [i] >= 0 ( V [ j + V [i] ] := dddd; V [i] -- ) |
| 100 | cond0 | 000 | i | -- | offs | offs | jump0 | IF cond0 ( goto offs ) |
|  | cond1 | 001 | i | j | offs | offs | jump1 | IF cond1 ( goto offs ) |
|  | cond0 | 010 | i | j | -- | -- | return | IF cond0 ( goto V [j] ) |
|  | cond0 | 100 | i | -- | offs | offs | loop0 | IF cond0 ( dec ( V [i] ); goto offs ) |
|  | cond1 | 101 | i | j | offs | offs | loop1 | IF cond1 ( dec ( V [i] ); goto offs ) |
|  | cond0 | 110 | i | j | offs | offs | loop2 | IF cond0 ( dec ( V [i], V [j]); goto offs ) |
| 110 | cond0 | 000 | i | j | offs | offs | jumpw | IF cond0 ( wait V [j] SECONDS FOR INPUT; goto offs ) |

FIG. 5

| BIT 3..4 | MEANING |
|---|---|
| % 00 | TRUE |
| % 01 | V [i] > 0 |
| % 10 | V [i] < 0 |
| % 11 | V [i] = 0 |

FIG. 6

| BIT 3..4 | MEANING |
|---|---|
| % 00 | TRUE |
| % 01 | V [i] > V [j] |
| % 10 | V [i] < V [j] |
| % 11 | V [i] = V [j] |

FIG. 7

| BIT 5..7 | MEANING |
|---|---|
| % 000 | ADD |
| % 001 | MIN |
| % 010 | MUL |
| % 011 | DIV |
| % 100 | MOD |
| % 101 | AND |
| % 110 | OR |
| % 111 | XOR |

FIG. 8

RECORD CARRIER, APPARATUS AND METHOD

FIELD OF THE INVENTION

The invention relates to the field of programmed editing of the order of playback of video data.

BACKGROUND OF THE INVENTION

The invention pertains to a record carrier storing at least video-related user data and control data in digital form, which control data enable playback control of the user data, which control data comprises at least play control data which defines user data items which are playable, at least selection control data for enabling the user to select and control reproduction of user data and at least variable control data for operating on user and system variables.

The invention further pertains to an apparatus capable of reproducing user-data under control of control data, the user data and the control data being stored in digital form on a record carrier, which user data comprises at least video data, which control data comprises at least play control data which defines user data items which are playable and at least selection control data for enabling the user to select and control reproduction of user data items, which control data further comprise variable control data defining operations on user and system variables, which apparatus is provided with control means comprising a processor controllable by said control data.

The invention further pertains to a method of reproducing user-data under control of control data, according to which method the user data and the control data are read from a record carrier on which these data are stored in digital form, which user data comprises at least video data, which control data comprises play control data, selection control data and variable control data, according to which method user data items are played under control of the play control data, according to which method the selection control data enables the user to select and control reproduction of user data items, according to which method the variable control data control operations on user and system variables.

Such a record carrier, apparatus and method are known from WO 98/09290. The play control data in the form of Play Lists enables the record and/or playback device to reproduce the user data in a predetermined order. Apart from video data, the user data may contain for example audio data, and data giving information about the video and/or audio data. The selection control data, in the form of Selection Lists enable the user to make a selection out of the available Play Lists by giving input to the apparatus. In addition the known apparatus can process variable control data by performing arithmetical operations and logical tests. The variable control data enables the apparatus a further way of controlling the playback of user data at the record carrier dependent of the history of user input.

In the known record carrier the variable control data comprises a Statement List which describes operations on variables and a Conditional List which describes conditional jumps.

SUMMARY OF THE INVENTION

It is a purpose of the invention to provide means which enable more simple variable control.

For this purpose the apparatus is characterized in that the apparatus is adapted to be controlled by variable control data which comprises instructions for conditional arithmetical operations.

For this purpose the record carrier is characterized in that the variable control data comprises at least one instruction for a conditional arithmetical operation.

For this purpose the method is characterized in that the variable control data comprises at least one instruction for a conditional arithmetical operation.

The invention is based on the insight that for interactive playback of audio/visual data, the choice of what is to be played back depends on many parameters, such as the current user input, the history of user input, the region of playback etc. A plurality of the operations necessary for playback control is therefore performed conditionally. As the apparatus of the invention is adapted to be controlled by variable control data which comprises instructions for conditional arithmetical operations, the variable control data can be concise so that less memory space is required and variable control is simplified.

The conditional arithmetical operations are for example addition, subtraction, multiplication, division and modulo calculation. Whether the arithmetic operations specified in the instruction are performed depends on the outcome of a logical test.

In the record carrier of the invention, the variable control data can be clearly structured. Operations which are to be performed conditionally can be arranged in the same sequence as other operations.

Such a way of control is very suitable for educational purposes: According to instructions in the variable control data the processor can evaluate the progress of the user, for example by evaluating results of user responses upon questions presented by the apparatus. Depending on the outcome of the evaluation the system can select an educational session to continue with.

In a favorable embodiment the record carrier is characterized in that, the instructions are embedded in Command Lists which further comprise a Command List Header which precedes the instruction and an unconditional goto which succeeds the instruction, and which refers to a next List (e.g. another Command List, a Play List or a Selection List).

It is preferred that each Command List comprises only one instruction apart from the unconditional goto.

This embodiment is advantageous if the record carrier is to be played by an apparatus of the invention in which the same processor which interprets the play control data and the selection control data also interprets the variable control data. The header enables the processor to recognize the type of control data. The unconditional goto instruction passes control to a next List, which may be either a Command List, or for example a Play List, which forms play control data or a Selection List which forms selection control data.

Otherwise the apparatus of the invention can have separate processors for interpreting the variable control data and the other control data. The processors can for example communicate with each other via variables which are stored in a common memory.

These and other aspects of the invention are described with reference to the drawing. Therein:

BRIEF DESCRIPTION OF THE DRAWINGS

FIG. 2 shows the syntax of an embodiment of a Play List, FIG. 3 shows the syntax of an embodiment of a Selection List, FIG. 4 shows the syntax of an embodiment of a Command List, FIG. 5 shows the syntax of possible instructions for the Command List, FIGS. 6 and 7 show the semantics of the conditional portion of these instructions, FIG. 8 shows the syntax of the portion representing arithmetical operations.

DETAILED DESCRIPTION OF THE INVENTION

Figure 1:
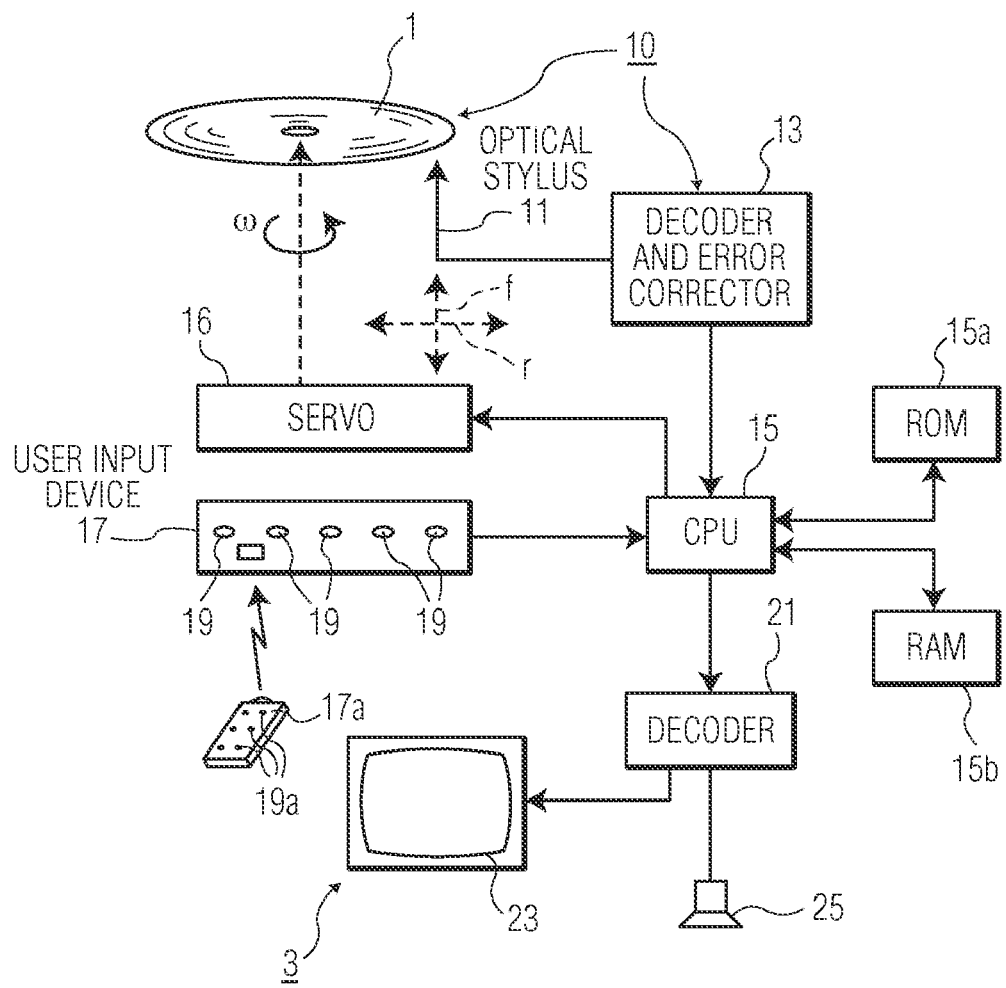
FIG. 1 shows an embodiment of an apparatus in accordance with the invention.

FIG. 1 shows a system 10 comprising an apparatus 3 and a record carrier 1 in accordance with the invention. The apparatus is capable of reproducing user-data under control of control data, the user data and the control data being stored in digital form on the record carrier 1. The record carrier 1 is e.g. an optical disc comprising digital audio/video/data information in an embossed information layer.

This information is to be read out by use of an optical stylus 11 (known as such) which supplies the detected data to a decoding and error correcting means 13. The decoded and error corrected data are supplied to a processor 15, which cooperates with a ROM memory 15a and a RAM memory 15b to control and operate on the data flow received from decoding and error correcting means 13. A first task of the controller 15 is to provide control signals, such as velocity control tracking and focusing control signals to the servo system 16. The servo system 16 controls the angular velocity ω of the rotating disc 1 as well as the position of the optical stylus 11 with respect to the track of the optical disc 1, which has been shown by the dotted arrow r. Further the servo system 16 controls the focusing of the optical stylus, such that the bright bundle emitted by the laser is focused on the information layer of the optical disc (which has been shown by the dotted arrow f).

A second task of the processor 15 is to control the audio and video bit stream to the dedicated decoders 21, which decode the e.g. MPEG2 coded video and audio and supply the decoded video to a display 23 and the decoded audio to a speaker or speaker system 25 (e.g. a multi channel sound system).

The information to be reproduced by the display 23 and sound system 25 is selectable by user input, which is received e.g. by direct control of selection buttons 19 of the input means 17 of the optical disc player 3 or via a remote control device 17a having selection buttons 19a. Of course, other possibilities of control are available and adequate, such as but not limited to: voice control, control via a direct link to a personal computer or via a telephone modem etc.

The processor 15 of the shown embodiment can be a relatively low power microcontroller having 1 MIPS (million instructions per second) capacity. It is possible to have the video and audio MPEG2 decoding realized by a software controlled processor 15, which then should be a high speed high power process unit equipped with adequate amounts of RAM and ROM memory 15a and 15b.

The control data stored by the record carrier comprises at least play control data, here in the form of Play Lists, which defines user data items which are playable (also denoted as Play Items), for example a plurality of user data items which are playable in sequence. The control data further comprises selection control data, here in the form of Selection Lists, for enabling the user to select and control reproduction of user data items. The control data further comprises variable control data, in the form of Command Lists, defining operations on user and system variables. A more detailed description is given below. Therein hexadecimal numbers are preceded by a $ and binary numbers are preceded by a %.

The syntax of the Play List is shown in FIG. 2. The semantics of the entries therein are as follows:

The Play List Header is a code which identifies the beginning of the Play List, in this example having the value $10.

The Number Of Items (NOI) gives the number of Play Items in this Play List. The minimum value of NOI is 1.

The List ID gives the List ID Number. Preferably the List ID Number is unique among all Lists on the record carrier.

The Previous List Offset contains a reference to the List that is to be interpreted on execution of a "PREVIOUS" function. Preferably that List is the List which would be reproduced before the current Play List when reproducing the contents of the record carrier in default order, so that the effect of the "PREVIOUS" function corresponds to the intuitive notion that the user has of this function.

The Next List Offset contains a reference to the List that is to be interpreted after interpretation of the current Play List is completed. Interpretation of the List referred to in the Next List Offset may also be realized immediately by execution of the "NEXT" function.

The Return List Offset contains a reference to the List that is to be interpreted when a "RETURN" function is executed. The "RETURN" function gives the user control at a higher hierarchical level. The user may for example have selected the current Play List out of number of selections comprised in a Selection List (described below). In that case execution of the "RETURN" function during interpretation of the current Play List has the effect that control is passed to the said Selection List.

Playing Time defines the time to play from each Play Item of this Play List starting from the beginning of the Play Item. In practice the time to play can not exceed the duration of any Play Item. The value of this entry can be set to $0000 to achieve that the Play Items are played completely. The value of this entry may be modified during interpretation of the current Play List, so as to achieve that Play Items have a mutually different playing time.

The Play Item Wait Time defines the wait time after playing each Play Item. The wait may be interrupted by a user interaction function. The value of this entry may be modified during interpretation of the current Play List, so as to achieve different waiting times between the Play Items. The waits may be terminated by a user interaction function (e.g. the "NEXT" function).

Auto Pause Wait Time is the wait time at Auto Pause. If a sector is played in which an Auto Pause flag is set, the wait time after play back of the Play Item is finished is the Auto Pause Wait Time instead of the Play Item Wait Time. Likewise this wait time may be interrupted by a user interaction.

The entry Play Item #n, represents the identification number of a Play Item. The said number may for example directly refer to a track containing a Play Item or to an entry in a table containing a reference to such a track. The Play Item is for example the whole or part of an MPEG Audio/Video Track, or MPEG encoded Still Pictures with optional MPEG Audio, or MPEG audio without image data.

The syntax of the Selection List is shown in FIG. 3. The semantics of the entries are as follows:

The Selection List Header identifies the beginning of the Selection List and equals $18 in this example.

The 8-bit field Flags can contain a plurality of flags. In case each of the bits in the field represents a flag. One flag indicates for example whether Selection Area Fields are present. These Fields contain additional date for use with selection systems that use screen pointing devices. The additional data comprises e.g. coordinates of a rectangular region at the screen which is to be pointed at with the pointing device in order to execute a particular function or to select from a number of options.

The Number Of Selections (NOS) gives the number of selections which this List enables.

The Base Of Selection Number (BSN) indicates the first selection number of this List.

The definition of the List ID is analogous to that of the Play List.

Previous List Offset: See the definition of Previous List Offset of the Play List.

The Next List Offset is the reference to the List that is interpreted on execution of the NEXT function Return List Offset: See the definition of Return List Offset of the Play List.

The field Default List Offset contains an offset to the List which is interpreted upon execution of a "Default Selection" function. With this function the user may indicate that he has no preference for a particular selection for example by striking an arbitrary key not corresponding to a selection.

Time-out List Offset gives a reference of a List that is interpreted after Time out i.e. if the wait-time has expired and no user interaction has taken place.

Wait Time for Time-out gives the duration for time-out.

Play Item Number defines the Play Item to be reproduced when the present Selection List is interpreted. The Play Item is for example a menu indicating the possible options.

Loop Count & Jump Timing specifies the number of times that the Play Item specified in the field Play Item Number is to be repeated, and whether said replay of said Play Item should be interrupted immediately upon user interaction or not.

The fields Selection #BSN Offset until Selection #(BSN+NOS−1) Offset represent the reference to the List that is interpreted when the corresponding selection having a number in the range from BSN until BSN+NOS−1 is made.

The syntax of the Command List is shown in FIG. 4.

The semantics of the Command List are as follows:

Command List Header: This field identifies the start of a Command List. The value is $20.

Instruction Field This field defines the operations to be carried out by the processor. Possible instructions are set out in FIG. 5.

Next List Offset: This field defines the offset to the next List to execute or play.

FIG. 5 shows an overview of possible instructions for the Instruction Field of a Command List The first byte of the instruction is an opcode, indicating the type of operation to be performed and the following 4 bytes are operands. In this Figure, the symbols i,j,k,l represent indices to an array of variables. If accidentally a read or write access is attempted to a reserved location of the array, the command is not executed. The symbols dddd represent a 16 bit signed constant. The symbol offs represent an offset of a next Command List. The third and the fourth bit of the opcode can contain a conditional opcode cond0 or cond1. The semantics for cond0 and cond1 are set out in FIGS. 6 and 7, resp. A binary value of cond0 being equal to 01, 10 and 11 respectively means that the instruction is only performed if the condition $V[i]>0$, $V[i]<0$, $V[i]=0$ is fulfilled respectively. If cond0 equals to 00 its meaning is TRUE, hence the remaining portion of the instruction is performed unconditionally. Analogously if the value of cond1 is equal to 01, 10 and 11 the instruction is only performed if the condition $V[i]>V[j]$, $V[i]<v[j]$, $V[i]=V[j]$ is fulfilled. If cond1 equals to 00 its meaning is TRUE, hence the remaining portion of the instruction is performed unconditionally. In the table of FIG. 5 there are four main sets of instructions which are denoted by the first three bits of the opcode. A first set having an opcode starting with the bits 001 comprises arithmetical and logical operations wherein $V[k]$ and $V[l]$ are input variables and $V[j]$ is an output variable. The type of calculation is determined by bits 5 to 7 of the opcode as set out in FIG. 8. Whether the operation is performed depends on the value of the conditional opcode cond0. In the present embodiment arithmetical operations are addition (ADD), subtraction (MIN), multiplication (MUL), division (DIV) and modulo (MOD). Logical operations are AND, OR and XOR.

The second set has an opcode starting with the bits 010. This set of instructions comprises assignments. The instruction "010 cond0 000" provides for assignment of the value of variable $V[l]$ to variable $V[k]$ provided that condition cond0 is true. Likewise the instruction "010 cond1 001" provides for assignment of the value of the variable $V[l]$ to variable $V[k]$ if condition cond1 is true. The instruction "010 cond0 010" provides for assignment of the value of the constant dddd to variable $V[j]$ if condition cond0 is true. The instruction "010 00 110" results in a block of variables being assigned the value dddd while the variable $V[i]$ greater than or equal to 0. The variable currently being filled is indicated by index $j+V[i]$. After each assignment the variable $V[i]$ is decreased by 1.

The third set comprises goto instructions. This set has an opcode starting with the bits 100. Opcodes "100 cond0 000" and "100 cond0 001" respectively effectuate a jump to the List at address "offs" if cond0 is true and if cond1 is true. Opcodes "100 cond0 010" effectuate a jump to the List at address stored in variable $V[j]$ if cond0 is true. Opcodes "100 cond0 100" and "100 cond1 101" effectuate a jump to the address "offs" and a decrease of the value of variable $V[i]$ by one if respectively cond0 and cond1 are true. The opcode "100 cond0 110" effectuates a jump to the address "offs" and a decrease of the variables $V[i]$ and $V[j]$ by one.

The fourth set, of which the opcode starts with the bits 110, comprises a wait and goto instruction. If this instruction "110 cond0 000" is performed the playback device will wait during $V[j]$ seconds for user input. If no input is received within that time interval the control jumps to the list at address "offs".

Apart from user variables, the command list interpreter can also access system variables. The system variables serve as an application programming interface between a so called virtual machine (VM) which processes the commands and the hardware of the reproducing apparatus. By acting on system variables, the instructions in the Command List can evaluate and/or influence system variables, such as the status of an overlay graphics channel, the setting of the audio channels (mute, mono, stereo, etc.). Additionally the instructions can cause the processor to read other parameters, such as the current disc identification, the current track, the current playing time.

The following table gives an example of possible variables to be controlled by commands in the Command List. The variables are stored in an array of 256 16-bit registers. The array comprises 16 read/write general purpose variables, having variable index 0-15. These variables are not initialized at the start of the Command List. In an embodiment of the apparatus of the invention the value of these variables is maintained when a record carrier is replaced by another record carrier, for example another record carrier belonging to the same album. The array further comprises 240 registers for system variables comprising reserved registers (variable index 16-207), player decoder registers (variable index 208-223), disc related registers (variable index 224-239), Play List related registers (variable index 240-251) and other system related registers (variable index 252-255).

TABLE 1

Variable Array

| Variable index | Type of register | Description |
|---|---|---|
| User variables | | |
| 0 ... 15 | R/W | get/set 16 bit general purpose variables |
| System variables | | |
| 16 ... 207 | — | Reserved |
| Apparatus decoder registers | | |
| 208 | R/W | get/set OGT_channel (0 ... 3) status |
| 209 | R/W | get/Set Audio_mixing (0 ... 3) status |
| 210 | R/W | gel/set Audio_stream (0 ... 3) status |
| 211 ... 223 | — | reserved |
| Disc related registers | | |
| 224 | R/W | get/set MPEG_PlayingTime |
| 225 | R/W | get/Set PlayItem_number (PIN) |
| 226 ... 239 | — | reserved |
| Play List related registers | | |
| 240 | R/W | get/set List_Offset |
| 241 | R/W | get/set Exception_Error List_Offset |
| 242 | R/W | get/set User_input |
| 243 ... 251 | — | reserved |
| Other system related registers | | |
| 252 | R/W | get/ set Timer |
| 253 | R/W | get/set Shuffle |
| 254 | R/W | get/set NV-RAM_block |
| 255 | Read Only | get Player Configuration status flags |

The VM can control the reproducing apparatus by setting a system variable, and the reproducing apparatus has then to execute controls that would generate the same status. The reproducing apparatus may reflect its status by setting a system variable, so that it can be read out by the VM. Note that a system variable actually corresponds to two different registers, one for read of the status of the reproducing apparatus, and one for giving a command to the reproducing apparatus. When the player is busy executing a register command, then these values could be different.

The system variables comprised in the table above are now described in more detail.

OGT-channel: The VM may activate an overlay graphics and text channel by setting this system variable. The VM may further determine whether an overlay graphics and text channel is activated, and if so identify the channel by reading said variable. The meaning of the variable is for example defined by the following table.

TABLE 2

| OGT_channel | |
|---|---|
| Value | Meaning |
| −1 | No OGT_channel displayed |
| i = 0 to 3 | channel i |

Audio_mixing: The VM may control the audio mixing status of the reproducing apparatus by setting this variable. The VM may also read this variable to verify the current status. The variable has for example the definition given in table 3.

TABLE 3

| Audio_mixing | |
|---|---|
| Value | Meaning |
| 0 | Audio mute |
| 1 | Left channel only |
| 2 | Right channel only |
| 3 | Stereo |

Audio_stream: This variable serves to control and to verify which audio stream is selected. The selection of the audio stream and the value of the variable may for example correspond according to table 4.

TABLE 4

| Audio_stream | |
|---|---|
| Value | Meaning |
| 0 | No Audio stream selected |
| 1 | Stream 1 |
| 2 | Stream 2 |
| 3 | Stream 1 + Extended Stream for Surround sound |

User_input: The VM may enable or disable user input by setting this variable to a first or a second value, e.g. 255 and 254 respectively. If user input is enabled the VM may obtain the last user input by reading the variable. The user input may for example be a selection made by the user out of a plurality of options from offered by a Selection List. Examples of values of this variable are given in table 5.

TABLE 5

| User_Input values | | | |
|---|---|---|---|
| Read value | User input | Write value | meaning |
| 0 ... 99 | Numeric input or last selection | 254 ($00FE) | Disable User input |
| | | 255 ($00FF) | Enable User input |
| 100 | Default selection | else | VOID |
| 101 | Next | | |
| 102 | Previous | | |
| 103 | Return | | |
| — | reserved | | |

TABLE 5-continued

User_Input values

| Read value | User input | Write value | meaning |
|---|---|---|---|
| 254 ($00FE) | User input disabled | | |
| 255 ($00FF) | User input enabled | | |

MPEG_PlayingTime: The VM may request the time played of the last MPEG stream from the beginning of the stream by reading this variable. In addition the VM may set this variable and so define the time to play for the next Play Item starting from the beginning of the item. If the value set exceeds the Playing Time of the Play Item, then this function may be discarded. If the value is set to 0 then the Play Item may be played until its end.

PlayItem_number: The VM can retrieve an identification of the last Play Item which was reproduced by reading this variable. Setting this variable enables the VM to select a Play Item to be played. During play back of a Motion Picture Play Item special playback control as Pause/Play, Fast Forward etc. may be executed by the reproducing apparatus if the User Input is enabled. It is assumed that a Still Picture remains on screen until next PLAY, even during change of a record carrier.

List_Offset: Reading this variable provides the address of the current command list. The value can be saved in a user variable for a "go sub" Command List function. This function is the general method to goto an other List. This is not a normal gosub function, but by saving the value, a following Command List can find out the offset of the previous Command List and return back. Control of the apparatus can be transferred to another Command List by assigning the address of that Command List to the variable List_offset.

Exception_Error List_Offset: This variable may contain the address of a Command List to proceed with in case of a non recoverable or exceptional error (e.g. divide by 0, or illegal Command).

Timer: The VM may set this variable to a positive value. The apparatus will subsequently decrement the variable at regular time intervals, e.g. each 10th of a second (100 ms) down to 0 (zero). The VM may subsequently read the variable to verify how much time has passed since the variable was initialized.

Shuffle: The VM may obtain the next value from a shuffle sequence by reading this variable. The VM may also generate a shuffle sequence by subsequently assigning the numbers of the items to be reproduced to this variable.

NV-RAM_block: Reading this register provides an identification of a block of user variables which was restored from non-volatile RAM (NV-RAM) at start up. The block is for example identified by a two byte value, wherein the first byte) indicates the index of the first variable in the block, and the second byte (LSB) the number of variables in the block. Likewise the VM may specify a block of variables to be written to NV-RAM by setting this variable. The player may uniquely allocate an NV-RAM block for each record carrier by using a record carrier identification, or an identification of an album to which the record carrier belongs.

Player Configuration status flags: This variable is read only. The bits of the variable serve as flags which indicate the capabilities of the player.

Figure 9:
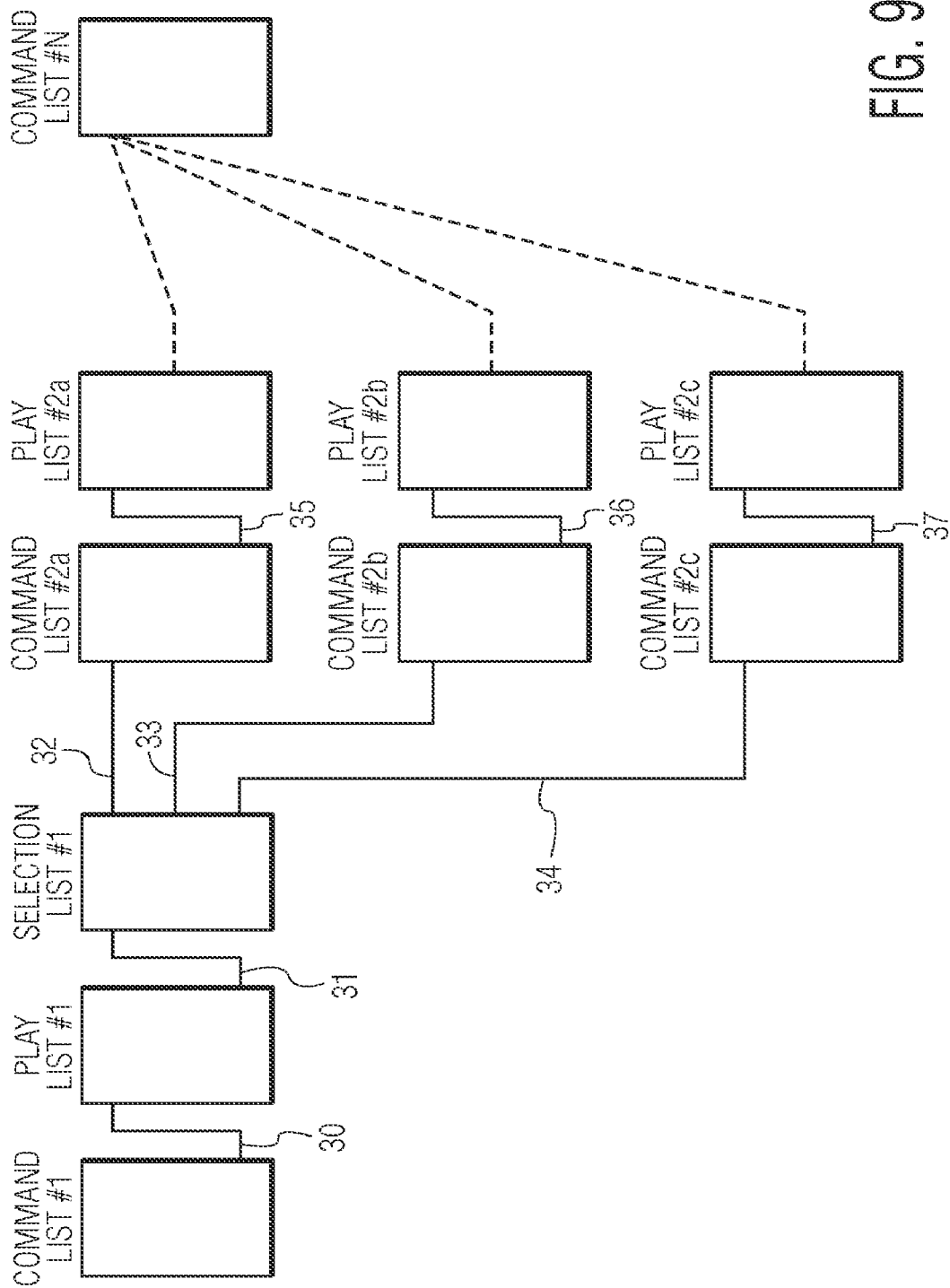
FIG. 9 shows an example of a combination of Play Lists, Selection Lists and Command Lists.

FIG. 9 shows an example where Play Lists, Selection Lists and Command Lists control the replay of user data in an English language course. The processor starts interpretation with Command List #1. This Command List effectuates that one or more counters indicating progress of the user are initialized. Values stored in the counters are for example a measure for the knowledge of grammar, for the usage of words, for the number of trials etc. In this example a Command List may comprise a plurality of instructions. In another embodiment each Command List comprises only one instruction, so that in case of a sequence of commands each of the Command Lists contains a pointer to the Command List having the succeeding instruction.

After the counters are initialized the control is passed to the Play List #1 indicated by the value of the pointer 30 in the field Next_List Offset of Command List #1. Upon interpretation of the Play List the processor effectuates that a first English module comprising one or more Play Items (not shown) with audio and/or video data is presented to the user. After this module is finished Selection List #1 which is pointed to (31) by the Next_List Offset of Play List #1 takes over control. This Selection List points to a Play Item (not shown), which presents the user a question about the first English module. The user can respond thereto by making a choice. Dependent on the choice made by the user, control is passed to one of the Command Lists #2a, #2b or #2c via pointers 32, 33 and 34 respectively. The Command Lists evaluate the input of the user, and adapt the scores. The Next_List Offset of the Command Lists refers (35, 36, 37) to a following Play List #2a, #2b or #2c, which effects the playback of a next English module. This next module can be succeeded by a next Selection List by which a next question is posed to the user. After a plurality of such sessions, comprising presentation of a module and the posing of a question, control is passed to a final Command List #n, which evaluates the history of user input and determines how to proceed the English language course.

Such an evaluation could for example comprise a conditional computation:

if (a>0) then $$R=(a+b)*(c+d)$$

else if (a<0) then $$R=(a-b)*(c-d)$$

else $$R=a*c$$

endif endif.

Herein R is the result of the calculation and a, b, c, and d are variables.

Such an computation may be implemented in a Command List as follows. Presume that the variables a, b, c, d are stored in the variable registers 0, 1, 2 and 3 and that the result R is stored in variable register 6. Registers 4, 5 are used for storing temporary results p, q. The instructions are shown in a mnemonic which corresponds to the definition according to the table in FIG. 4. Bits 5 to 7 are represented by the abbreviations defined in the table of FIG. 8. The parameters between the brackets correspond to the indices i,j,k,l as shown in Table 4. In this case the commands all belong to the group of conditional calculations.

```
001 01add (0, 4, 0, 1)      "if a > 0 then p = a + b"
001 01add (0, 5, 2, 3)      "if a > 0 then q = c + d"
001 01mul (0, 6, 4, 5)      "if a > 0 then R = p * q"
001 10sub (0, 4, 0, 1)      "if a < 0 then p = a − b"
001 10sub (0, 5, 2, 3)      "if a < 0 then q = c − d"
001 10mul (0, 6, 4, 5)      "if a < 0 then R = p * q"
001 11mul (0, 6, 0, 2)      "if a = 0 then R = a * c"
```

Variable control is relatively simple. No jumps are required and the computation can be described with a relatively small number of commands in comparison with a Command List in which only unconditional calculations can be used.

Whilst the invention has been described with reference to preferred embodiments thereof, it is to be understood that these are not limitative examples. Thus, various modifications may become apparent to those skilled in the art, without departing the scope of the invention, as defined by the claims. Further, any reference signs do not limit the scope of the claims. The invention, as far as incorporated in the reproducing apparatus, can be implemented by means of both hardware and software, and several "means" may be represented by the same item of hardware. The word "comprising" does not exclude the presence of other elements or steps than those listed in a claim. Also, the word "a" or "an" preceding an element does not exclude the presence of a plurality of such elements. In addition, the invention lies in each and every novel feature or combination of features.

The invention claimed is:

1. A method for controlling playback of a record carrier comprising user data and control data in digital form, wherein the control data enables playback control of the user data, the method comprising the acts of:
defining playable items of the user data; and
providing in the control data selection control data for enabling selection of the playable items of the user data, play data for reproduction of the selected user data, and variable data for operating on user and system variables;
wherein the variable comprises at least one instruction, including an operation code indicating a type of operation to be performed, a condition code, a type of calculation and operands, wherein the operation is to be executed if the condition code has first second and third values and at least one of respective first, second and third conditions are met, and wherein the operation is executed unconditionally if the condition code has a fourth value so that the operation is performed by execution of the at least one instruction without jumps and with reduced number of commands, and wherein the operation is adapted to be performed in conjunction with at least one of said operands.

2. The method of claim 1, further comprising the act of embedding the at least one instruction in a Command List comprising a Command List Header which precedes the at least one instruction, and wherein the Command List further comprises an unconditional goto which points to a next list to be executed following execution of said Command List.

3. The method of claim 2, wherein the next list is another Command List.

4. The method of claim 2, wherein the next list is not another Command List.

5. The method of claim 2, wherein the Command List does not include any other instruction apart from the unconditional goto.

6. The method of claim 2, further comprising the acts of:
embedding play control data including the playable items in Play Lists, the Play Lists comprising at least a Play List Header as a first item and at least one Play Item representing playable user data and at least one reference to a further List; and
embedding the selection control data in Selection Lists, the Selection Lists comprising at least a Selection List Header, at least one reference corresponding to a user selection, the Headers being mutually different;
wherein the Command List includes a reference to a Play List of the Play Lists or a Selection List of the Selection Lists.

7. The method of claim 1, further comprising the act of storing the operation code and the operands of each instruction in a contiguous set of bytes.

8. The method of claim 1, wherein the at least one instruction includes a plurality of instructions, and wherein the instructions of the plurality of instructions are adapted to be executed in a coordinated fashion in accordance with a computer program based on an algorithm.

9. The method claim 1, wherein the operands in a first instruction of the at least one instruction include indices pointing to elements of an array.

10. The method claim 9, wherein a condition denoted in the first instruction includes a dependence on at least one of said indices.

11. The method of claim 10, wherein the operation denoted in the first instruction is an Arithmetic operation.

12. The method of claim 11, wherein an index of said indices points to an element E of said array, and wherein the condition is E>0, E<0, or E=0.

13. The method of claim 11, wherein a first index of said indices point to a first element E1 of said array, wherein a second index of said indices point to a second element E2 of said array, and wherein the condition is E1>E2, E1<E2, or E1=E2.

14. The method of claim 9, wherein the operation denoted in the first instruction is a logical operation.

15. The method of claim 9, wherein the operation denoted in the first instruction is an assignment operation.

16. The method of claim 15, wherein the operands in the first instruction further includes a constant adapted to be inserted by the first instruction into at least one element of said array.

17. The method of claim 9, wherein the operation denoted in the first instruction is a jump operation, wherein a jump adapted to be executed by the jump operation is a jump to a list adapted to be next executed.

18. The method of claim 9, wherein the operation denoted in the first instruction is a wait operation.

19. An apparatus for reproducing user data under control of control data, comprising a processor controllable by the control data and a record carrier for storing the user data and the control data in digital form, wherein the user data comprising video data, and wherein the control data comprises:
play control data which defines user data items of the user data which are playable;
selection control data for enabling the user to select user data and control reproduction of the selected user data; and
variable control data for operating on user and system variables, wherein the variable control data comprises at least one instruction including an operation code indicating a type of operation to be performed, a condition code, a type of calculation and operands, wherein the operation is to be executed if the condition code has first, second and third values and at least one of respective first, second and third conditions are met, and wherein the operation is executed unconditionally if the condition code has a fourth value so that the operation is performed by execution of the at least one instruction without jumps and with reduced number of commands, and wherein the operation is adapted to be performed in conjunction with at least one of said operands.

20. The apparatus of claim 19, wherein the processor comprises a single interpreter which is adapted to process the play control data, the selection control data and the variable control data sequentially.

21. The apparatus of claim 19, wherein the at least one instruction is embedded in a Command List comprising a Command List Header which precedes the at least one instruction, and wherein the Command List further comprises an unconditional goto which points to a next list to be executed following execution of said Command List.

22. The apparatus of claim 19, wherein the operands in a first instruction of the at least one instruction include indices pointing to elements of an array.

23. The apparatus of claim 22, wherein the condition denoted in the first instruction includes a dependence one at least one of said indices.

24. The apparatus of claim 22, wherein the operation denoted in the first instruction is an arithmetic operation.

25. The apparatus of claim 24, wherein an index of said indices points to an element E of said array, and wherein the condition is E>0, E<0, or E=0.

26. The apparatus of claim 24, wherein a first index of said indices point to a first element E1 of said array, wherein a second index of said indices point to a second element E2 of said array, and wherein the condition is E1>E2, E1<E2, or E1=E2.

27. The apparatus of claim 22, wherein the operation denoted in the first instruction is a logical operation.

28. The apparatus of claim 22, wherein the operation denoted in the first instruction is an assignment operation.

29. The apparatus of claim 28, wherein the operands in the first instruction further includes a constant adapted to be inserted by the first instruction into at least one element of said array.

30. The apparatus of claim 22, wherein the operation denoted in the first instruction is a jump operation, wherein a jump adapted to be executed by the jump operation is a jump to a list adapted to be next executed.

31. The apparatus of claim 22, wherein the operation denoted in the first instruction is a wait operation.

32. A method of reproducing user data under control of control data comprising the acts of:
reading the user data and the control data from a record carrier on which the user data and control data are stored in digital form, wherein the user data comprises video data, wherein the control data comprises play control data, selection control data and variable control data, wherein the selection control data enables a user of the method to select and control reproduction of user data items of the user data, wherein the variable control data controls operates on user and system variables, wherein the variable control data comprises at least one instruction including an operation code indicating a type of operation to be performed, a condition code, a type of calculation and operands, wherein the operation is to be executed if the condition code has first second and third values and at least one of respective first, second and third conditions are met, and wherein the operation is executed unconditionally if the condition code has a fourth value so that the operation is performed by execution of the at least one instruction without jumps and with reduced number of commands, and wherein the operation is adapted to be performed in conjunction with at least one of said operands; and
playing the user data under control of the play control data.

33. The method of claim 32, wherein the at least one instruction is embedded in a Command List comprising a Command List Header which precedes the at least one instruction, and wherein the Command List further comprises an unconditional goto which points to a next list to be executed following execution of said Command List.

34. The method of claim 32, wherein the operands in a first instruction of the at least one instruction include indices pointing to elements of an array.

35. The method of claim 34, wherein the condition denoted in the first instruction includes a dependence one at least one of said indices.

36. The method of claim 34, wherein the operation denoted in the first instruction is an arithmetic operation.

37. The method of claim 36, wherein an index of said indices points to an element E of said array, and wherein the condition is E>0, E<0, or E=0.

38. The method of claim 36, wherein a first index of said indices point to a first element E1 of said array, wherein a second index of said indices point to a second element E2 of said array, and wherein the condition is E1<E2, E1<E2, or E1=E2.

39. The method of claim 34, wherein the operation denoted in the first instruction is a logical operation.

40. The method of claim 34, wherein the operation denoted in the first instruction is an assignment operation.

41. The method of claim 40, wherein the operands in the first instruction further includes a constant adapted to be inserted by the first instruction into at least one element of said array.

42. The method of claim 34, wherein the operation denoted in the first instruction is a jump operation, wherein a jump adapted to be executed by the jump operation is a jump to a list adapted to be next executed.

43. The method of claim 34, wherein the operation denoted in the first instruction is a wait operation.

* * * * *